Jan. 19, 1926.

C. J. LAWLESS 1,569,863

CUP HOOK AND SUPPORT

Filed April 19, 1924

Inventor
C. J. Lawless
By Philip A. Sorell
Attorney

Patented Jan. 19, 1926.

1,569,863

UNITED STATES PATENT OFFICE.

CHRISTOPHER J. LAWLESS, OF ERICSON, NEBRASKA.

CUP HOOK AND SUPPORT.

Application filed April 19, 1924. Serial No. 707,636.

*To all whom it may concern:*

Be it known that CHRISTOPHER J. LAWLESS, a citizen of the United States, residing at Ericson, in the county of Wheeler and State of Nebraska, has invented certain new and useful Improvements in Cup Hooks and Supports, of which the following is a specification, reference being had therein to the accompanying drawings.

The invention relates to cup hooks and supports particularly adapted for supporting a cup on the edge of a bucket, but applicable for supporting any kind of a receptacle, and has for its object to provide a device of this character whereby the cup or receptacle is provided with a hook, preferably adjacent the lower end of the handle, whereby a cup or receptacle will be supported on a support in a horizontal position. Cups are generally dipped into pails of water, consequently when gripped by the handle thereof, the handle does not come into contact with the water, but the body of the cup, and the spring hook forms a finger engaging member for preventing the finger from coming into contact with the body of the cup, consequently the cup will not become soiled by engagement with the hand of the user thereof, for instance where a dipper is used which is generally gripped by the handle adjacent the bowl, thereof, consequently when the dipper is submerged in the water by subsequent users the dirt on the handle, incident to soiled hands is dissolved in the water.

A further object is to form the spring supporting hook and the handle of the receptacle from a single piece of material bent upon itself to form the hook at the lower side of the handle.

With the above and other objects in view the invention resides in the combination and arrangement of parts as hereinafter set forth shown in the drawing, described and claimed, it being understood that changes in the precise embodiment of the invention may be made within the scope of what is claimed without departing from the spirit of the invention.

In the drawing:—

Figure 1:
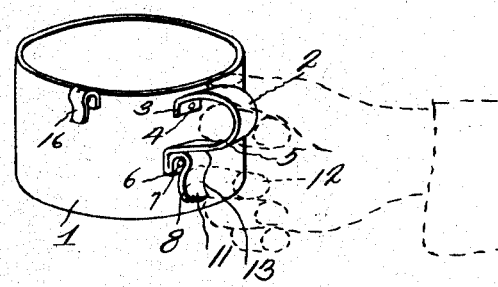
Figure 1 is a perspective view of the cup, showing the handle and supporting hook applied thereto.
Figure 2:
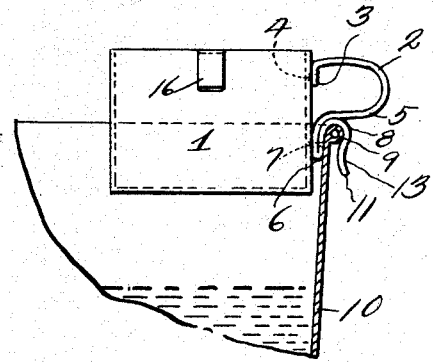
Figure 2 is a side elevation of the cup showing the same supported on the side of a bucket.
Figure 3:
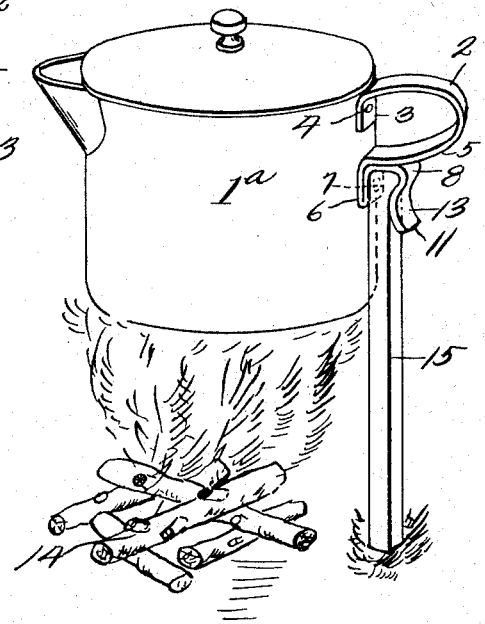
Figure 3 is a perspective view of the device showing the same applied to a cooking utensil, and supported on a camp stake over a fire.

Referring to the drawing the numeral 1 designates a conventional form of tin cup and 2 the handle thereof, which handle is U-shaped and provided with a downwardly extending flange 3 which is riveted or otherwise secured at 4 to the body of the cup. The lower arm 5 of the handle 2 is substantially horizontally disposed and is provided with a downwardly extending arm 6 bent upon itself to make the same relatively heavy, and which arm is secured to the body of the cup by means of rivets 7. The outer fold of the arm 6 is bent to form a U-shaped spring hook 8 adapted to receive the bead 9 of a bucket 10, and the arm 11 of the hook is preferably provided with sufficient spring so that it will spring over the bead 9 of the cup and prevent the cup from tilting after being placed on the bucket as shown in Figure 2. The arm 11 curved inwardly below the bead 9, and consequently the easy tilting of the cup is prevented. It will be seen that the handle 2 and supporting hook 11 is formed from a single piece of material, thereby allowing the device to be cheaply constructed so it may be used in connection with cheap tin cups. It will be noted that when the operator grasps the handle 2 of the cup his second finger 12 will engage the concave portion 13 of the arm 11, and consequently will not come into engagement with the cup 1, as is the common difficulty with cups at present constructed, and which cups become dirty, and when dipped into the water, the dirt thereon incident to the engagement of the hand with the cup, is dissolved into the water. Although the device has been described in connection with a cup, it is to be understood that the handle and hook may be applied to any kind of a receptacle, for instance a cooking receptacle as shown in Figure 1ª, and in which view the hook 8 is shown as supporting the receptacle 1ª over a camp fire 14, and on the upper end of a stake 15; in this form the operation is substantially the same as that shown in Figure 2. It will be seen that where the device is applied to various kinds of cooking and camping utensils, said utensils can be supported in a position over a fire or suspended in any suitable manner, and it is to be understood the device may be applied to any kind of a receptacle.

From the above it will be seen that a hook is provided for supporting receptacles in a horizontal position, which hook is disposed adjacent the handle of the receptacle and also forms a finger engaging member for preventing the fingers from coming into engagement with the receptacle while handling the receptacle.

If desired the side of the cup 1 may be provided with a U-shaped hook 16 whereby the cup may be supported from one side thereof on the edge of a support, for instance a bucket.

The invention having been set forth what is claimed as new and useful is:—

The combination with a cup, a handle member carried by said cup, a supporting hook carried by said handle member at its lower side and adapted to receive a support for the cup and hold the cup in substantially a horizontal position, said handle member and hook being formed from a single piece of metal bent upon itself to form the hook, said hook extending outwardly in the same direction as the handle and engaging the under side of the handle.

In testimony whereof I hereunto affix my signature.

CHRISTOPHER J. LAWLESS.